(12) United States Patent
Patel et al.

(10) Patent No.: US 10,047,959 B2
(45) Date of Patent: Aug. 14, 2018

(54) FUEL INJECTOR FOR FUEL SPRAY NOZZLE

(71) Applicant: PRATT & WHITNEY CANADA CORP., Longueuil (CA)

(72) Inventors: Bhawan B. Patel, Mississauga (CA); Oleg Marenko, Oakville (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 90 days.

(21) Appl. No.: 14/982,602

(22) Filed: Dec. 29, 2015

(65) Prior Publication Data

US 2017/0184307 A1  Jun. 29, 2017

(51) Int. Cl.
| | | |
|---|---|---|
| F23D 11/16 | (2006.01) | |
| F23R 3/28 | (2006.01) | |
| F23R 3/12 | (2006.01) | |
| F02C 7/22 | (2006.01) | |

(52) U.S. Cl.
CPC ............... *F23R 3/28* (2013.01); *F02C 7/222* (2013.01); *F23R 3/12* (2013.01); *F05D 2220/32* (2013.01)

(58) Field of Classification Search
CPC .... F23R 3/28; F23R 3/12; F02C 7/222; F02C 7/18; F05D 2220/32; F05D 2240/35; F05D 2240/12; F05D 2260/30; F05D 2240/126
See application file for complete search history.

(56) References Cited

U.S. PATENT DOCUMENTS

| | | | | |
|---|---|---|---|---|
| 1,971,328 A | * | 8/1934 | Byrne | F23D 1/00 431/185 |
| 3,955,941 A | * | 5/1976 | Houseman | C01B 3/346 123/1 A |
| 5,228,283 A | * | 7/1993 | Sciocchetti | F02C 3/30 60/737 |
| 5,265,425 A | * | 11/1993 | Howell | F23R 3/14 60/736 |
| 5,697,553 A | * | 12/1997 | Stotts | B05B 1/3442 239/406 |
| 6,389,815 B1 | * | 5/2002 | Hura | F23R 3/346 60/746 |
| 6,595,769 B2 | * | 7/2003 | Watanabe | F23D 11/107 110/262 |
| 6,793,483 B2 | * | 9/2004 | Watanabe | F23D 11/103 431/158 |
| 8,302,404 B2 | | 11/2012 | Nilsson et al. | |
| 8,347,631 B2 | * | 1/2013 | Bailey | F23D 11/107 239/422 |
| 8,555,649 B2 | | 10/2013 | Patel et al. | |
| 8,726,668 B2 | | 5/2014 | Patel et al. | |

(Continued)

*Primary Examiner* — Arthur O Hall
*Assistant Examiner* — Adam J Rogers
(74) *Attorney, Agent, or Firm* — Norton Rose Fulbright Canada LLP

(57) ABSTRACT

A fuel injector for a fuel spray nozzle of a gas turbine engine combustor includes an angular lip axially projecting into an upstream section of an annular passage to guide a fuel layer vortex to flow along a radially outer passage wall of the annular passage and to guide an air layer vortex to fill into and pass through an annular space between the fuel layer vortex and a radially-inner passage wall of the annular passage. The air layer vortex is free of mixing with the fuel layer vortex before the fuel layer vortex is discharged from the annular passage for fuel atomization.

14 Claims, 5 Drawing Sheets

(56) References Cited

U.S. PATENT DOCUMENTS

| | | |
|---|---|---|
| 8,733,105 B2 | 5/2014 | Toon |
| 8,739,545 B2 | 6/2014 | Cant et al. |
| 8,800,146 B2 | 8/2014 | Mao et al. |
| 9,115,899 B2 | 8/2015 | Koizumi et al. |
| 2004/0061001 A1* | 4/2004 | Mao .......................... B05B 7/08 239/398 |
| 2008/0236165 A1* | 10/2008 | Baudoin ................. F23R 3/343 60/746 |
| 2009/0197214 A1* | 8/2009 | Bretz ..................... B05B 7/066 431/159 |
| 2010/0107647 A1* | 5/2010 | Bergen ..................... F01D 1/36 60/772 |
| 2012/0047903 A1* | 3/2012 | Williams .................. F02C 7/22 60/746 |
| 2012/0234013 A1* | 9/2012 | Overman ................ F23C 9/006 60/772 |
| 2013/0000307 A1* | 1/2013 | Cheung .................... F23R 3/14 60/737 |
| 2014/0338337 A1* | 11/2014 | Prociw ..................... F23R 3/28 60/737 |
| 2015/0089952 A1 | 4/2015 | Sadasivuni |
| 2015/0167962 A1* | 6/2015 | Chen ....................... F23C 7/002 431/353 |

* cited by examiner

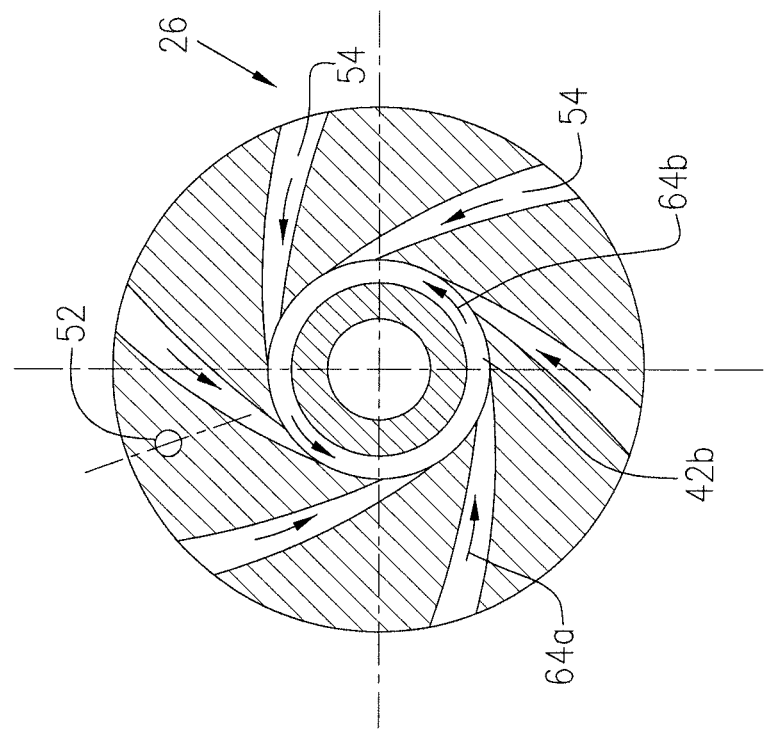
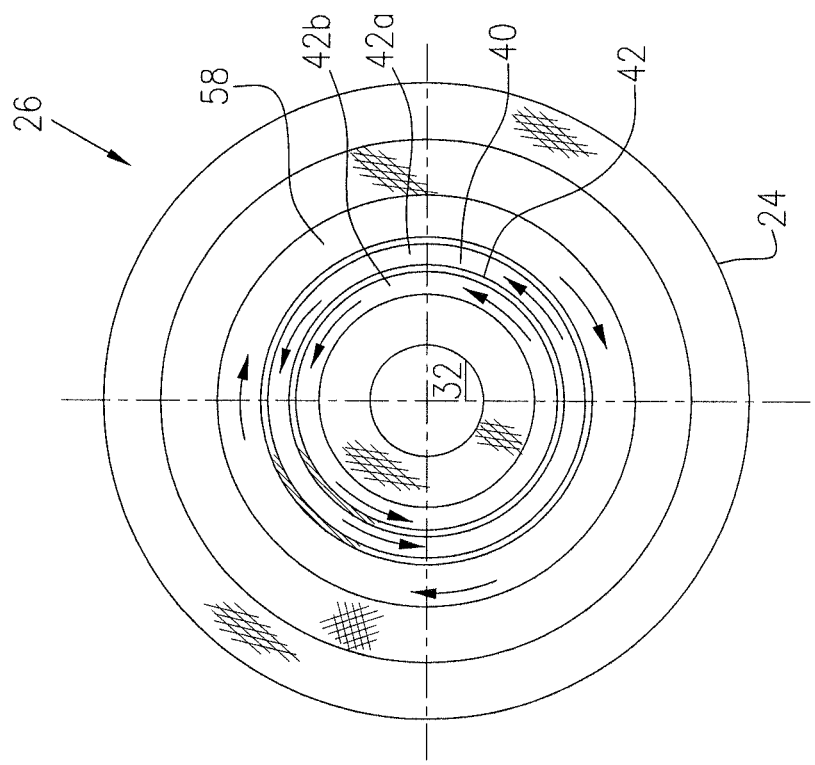
FIG. 4
FIG. 3

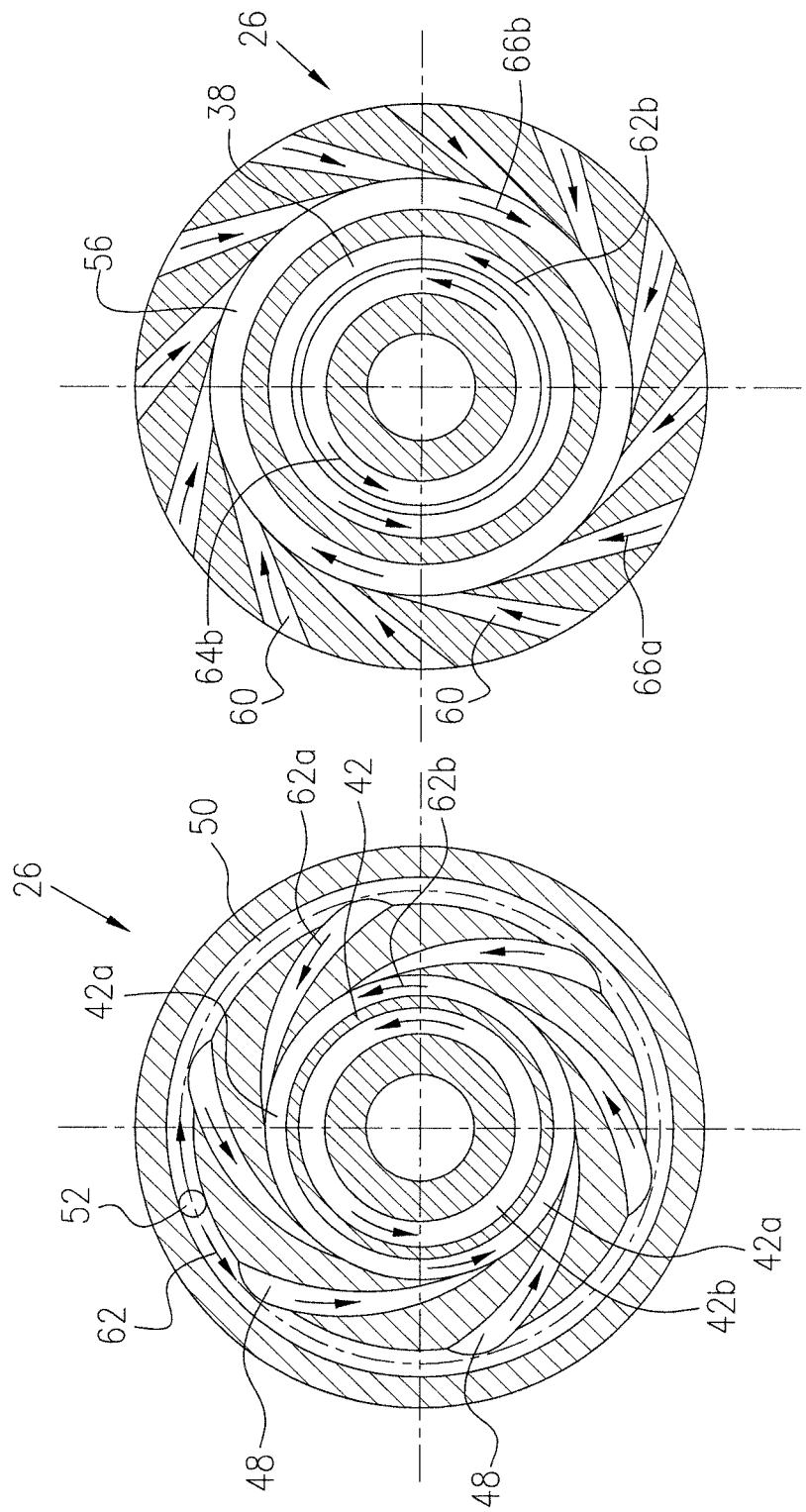

FUEL INJECTOR FOR FUEL SPRAY NOZZLE

TECHNICAL FIELD

The application relates generally to gas turbine engines and, more particularly, to a fuel injector for fuel spray nozzles in a combustor for such engines.

BACKGROUND OF THE ART

Gas turbine engines require fuel injection systems for delivering fuel to a combustion chamber in which the fuel is atomized and mixed with air before combustion. A fuel injection system may include one or more fuel spray nozzles to atomize the fuel in order to ensure its rapid evaporation and burning when mixed with air in the combustion chamber. A fuel spray nozzle may include a fuel injector which includes an annular fuel passage to deliver fuel and create an annular film of liquid fuel to be discharged from the annular fuel passage. The discharged annular liquid fuel film is then entrained in and atomized by swirling air streams produced by air swirlers. The swirling air streams move much more rapidly than the discharged liquid fuel film in order to atomize the latter. Efforts have been made to provide new configurations of fuel injectors and to improve fuel/air mixing and fuel atomization in order to achieve lean burn combustion while maintaining combustion efficiency during engine operation.

Accordingly there is a need for an improved fuel injector for a fuel spray nozzle and an improved method for spraying fuel into the combustor of gas turbine engines.

SUMMARY

In one aspect, there is provided a fuel injector for a fuel spray nozzle of a gas turbine engine combustor, the fuel injector defining an axial central axis thereof and comprising: an axially-extending first annular passage surrounding the central axis and located between radially outer and inner passage walls, the first annular passage having an open downstream end and including an annular lip projecting axially into and radially dividing an upstream section of the first annular passage into an outer-diameter upstream subsection and an inner-diameter upstream subsection, the outer-diameter upstream subsection configured for guiding a fuel layer vortex formed in the outer-diameter upstream subsection to flow along the annular outer passage wall toward the open downstream end, and the inner-diameter upstream subsection configured for guiding an air layer vortex formed in the inner-diameter upstream subsection to fill into and pass through an annular space defined by and radially between the fuel layer vortex and the annular inner passage wall; a plurality of circumferentially spaced spiral or tangentially-oriented fuel inlet passages in fluid communication with the outer-diameter upstream subsection of the first annular passage to deliver respective fuel flows into the first annular passage to form the fuel layer vortex; and a plurality of circumferentially spaced spiral or tangentially-oriented first air inlet passages in fluid communication with the inner-diameter upstream subsection of the first annular passage to deliver respective first air flows into the first annular passage to form the air layer vortex.

In another aspect, there is provided a method for spraying fuel into a combustor of a gas turbine engine, the method comprising: a) generating a fuel layer vortex rotating in a first rotational direction along a radially-outer passage wall of an annular passage and flowing axially through the annular passage, the fuel layer vortex being free of contacting a radially-inner passage wall of the annular passage; b) generating an air layer vortex rotating in the first rotational direction radially between the fuel layer vortex and the radially-inner passage wall and axially flowing through the annular passage, the air layer vortex being in contact with and free of mixing with the fuel layer vortex until the fuel layer vortex and the air layer vortex are discharged from the annular passage; and c) generating a swirling air flow to impinge on a sheet of swirling fuel formed by the fuel layer vortex discharged from the annular passage, resulting in atomized fuel spray in the combustor.

DESCRIPTION OF THE DRAWINGS

Reference is now made to the accompanying drawings in which:

FIG. 3 is a front elevational view of the fuel injector of FIG. 2, showing a front end of the fuel injector;

FIG. 4 is a cross-sectional view of the fuel injector of FIG. 2, taken along line 4-4 showing a plurality of circumferentially spaced spiral or tangentially-oriented first air inlet passages in fluid communication with an inner-diameter upstream subsection of a first annular passage of the fuel injector;

FIG. 5 is a cross-sectional view of the fuel injector of FIG. 2, taken along line 5-5 showing a plurality of circumferentially spaced spiral or tangentially-oriented fuel inlet passages in fluid communication with an outer-diameter upstream subsection of the first annular passage and in fluid communication with an annular fuel distribution passage;

FIG. 6 is a cross-sectional view of the fuel injector of FIG. 2 taken along line 6-6 showing a plurality of circumferentially spaced spiral or tangentially-oriented second air inlet passages in fluid communication with a second annular passage of the fuel injector.

It will be noted that throughout the appended drawings, like features are identified by like reference numerals.

DETAILED DESCRIPTION

Figure 1:
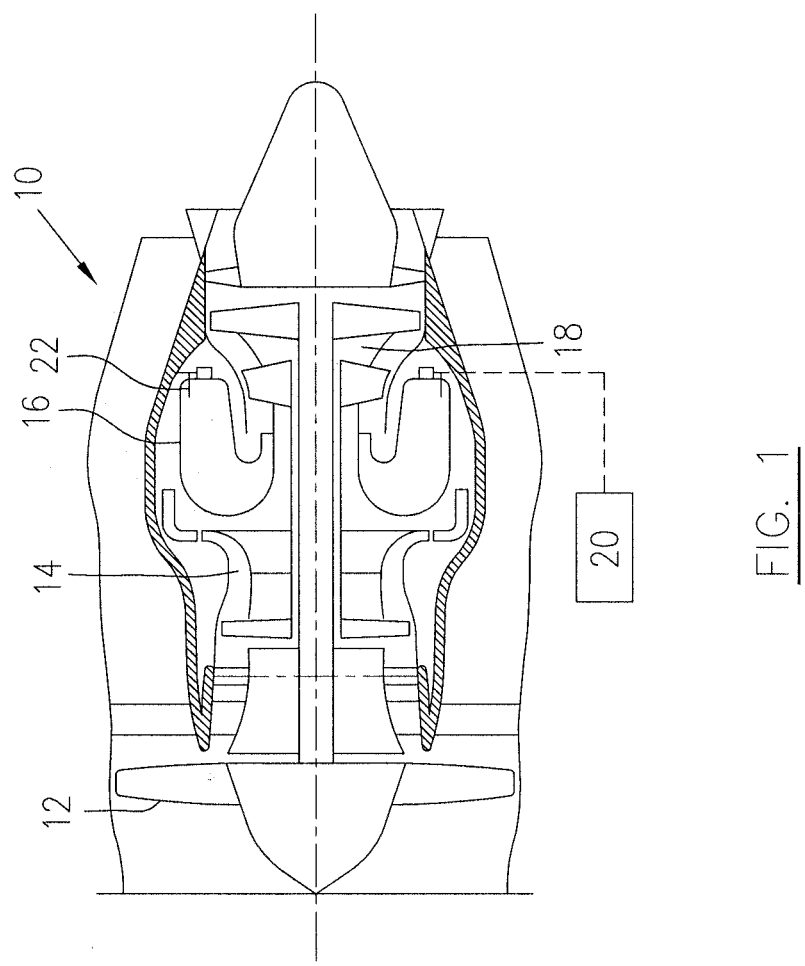
FIG. 1 is a schematic side cross-sectional view of a gas turbine engine as an example illustrating application of the described subject matter.

FIG. 1 illustrates a turbofan gas turbine engine 10, which is taken as an exemplary application of the described subject matter. The gas turbine engine 10 generally comprises in serial flow communication a fan 12 through which ambient air is propelled, a compressor section 14 for pressurizing the air, a combustor chamber 16 in which the compressed air is mixed with fuel and ignited for generating an annular stream of combustion gases, and a turbine section 18 for extracting energy from the combustion gases. The gas turbine engine 10 includes a fuel supply system 20 to supply fuel to a plurality of fuel spray nozzles 22 installed in the combustor chamber 16 to spray fuel mixed with air into the combustor chamber 16 for combustion.

Referring to FIGS. 2-7, the fuel spray nozzle 22 according to one embodiment may include a substantially cylindrical nozzle body 24 having an enlarged end. The fuel spray nozzle may define a fuel injector 26 disposed in and incorporated by the nozzle body 24, which will be further described in detail. The nozzle body 24 may define a central cylindrical cavity 30 about a central axis 28 with an open end 32 at a front end 34 of the nozzle body 24. A pilot fuel injector 36 may be provided in the fuel spray nozzle 22, and may be received in the central cylindrical cavity 30 for injecting fuel or a fuel/air mixture into the combustor chamber 16 during an engine starting procedure. The pilot fuel injector 36 is conventional and will not be further described.

Figure 2:
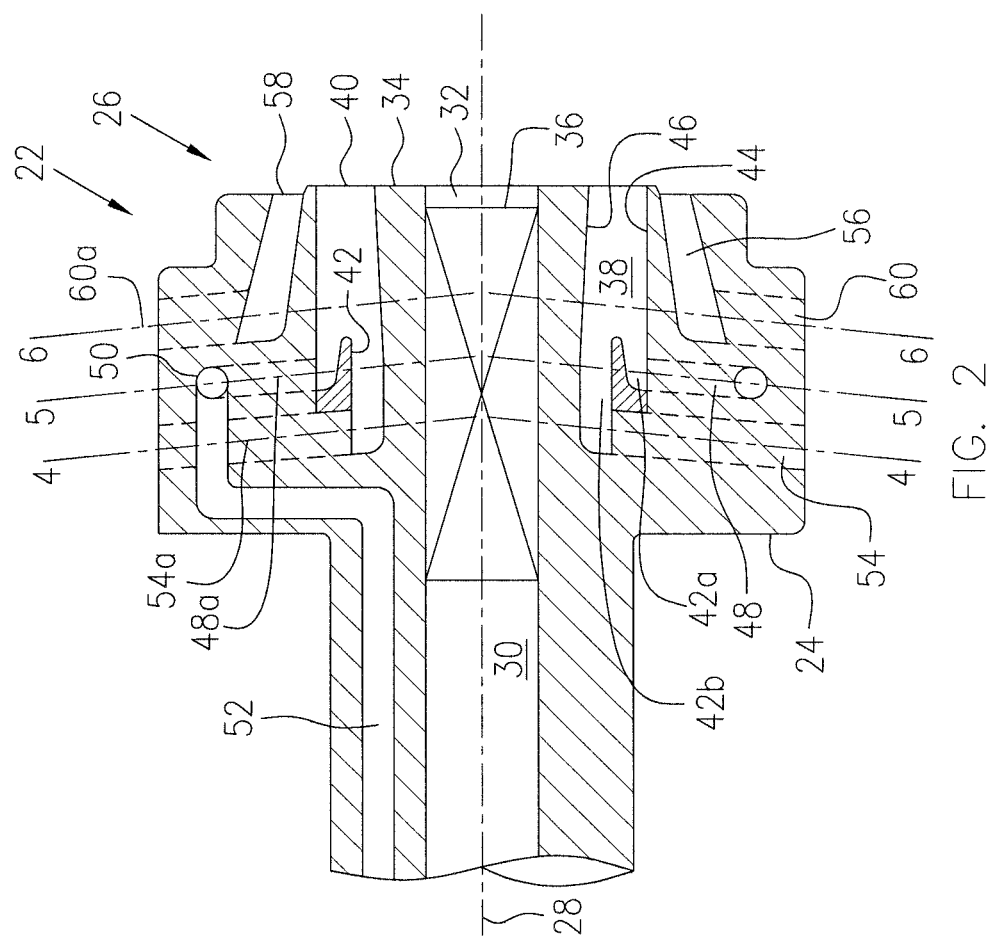
FIG. 2 is an axial cross-sectional view of a fuel injector according to one embodiment, defined in and incorporated with a fuel spray nozzle.
Figure 7:
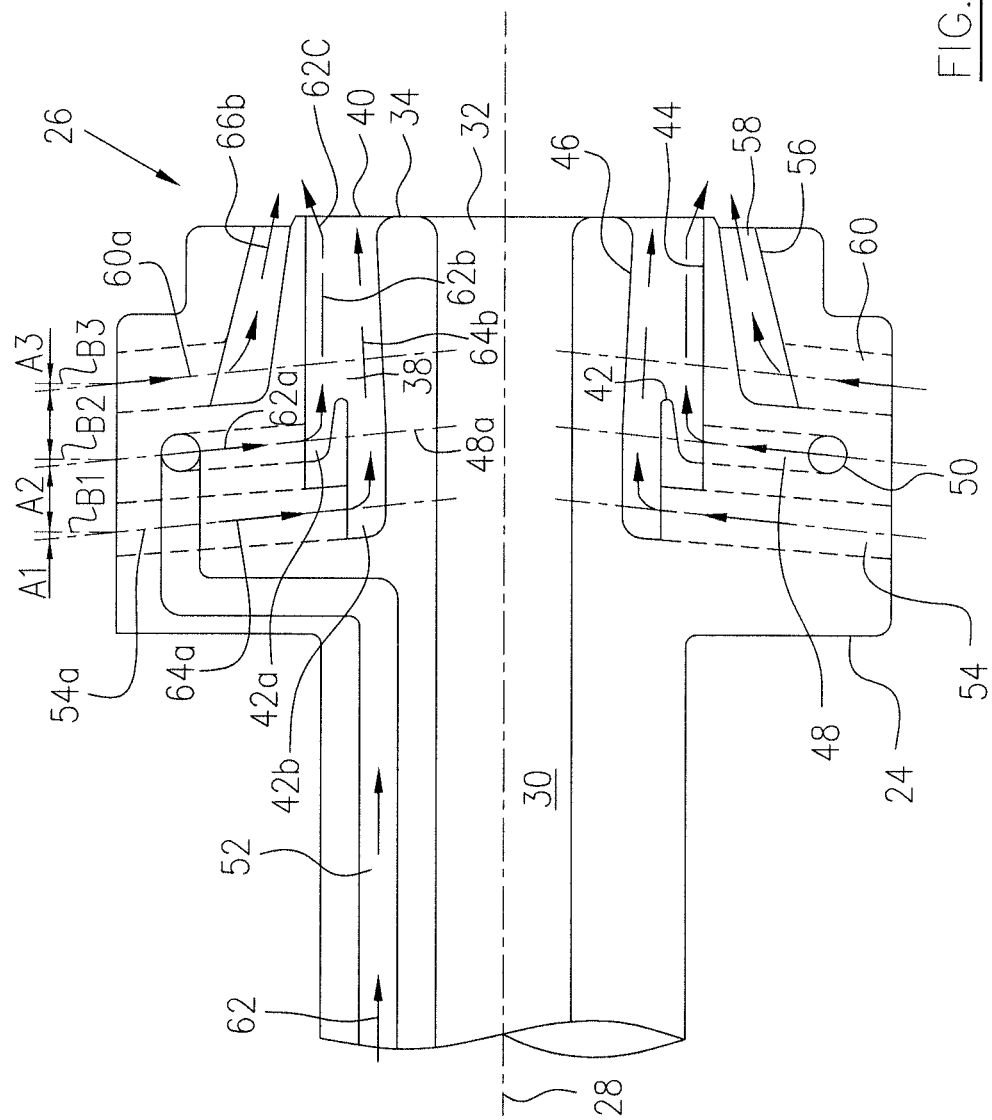
FIG. 7 is an axial cross-sectional view of the fuel injector of FIG. 2, with hatch lines in the cross section omitted for better illustration of the fuel and air flowing through the respective passages of the fuel injector.

It should be noted that because the fuel injector 26 is defined in and incorporated by the nozzle body 24. The nozzle body 24 thus forms the injector body and hereinafter will be referred to as "the body 24". The central axis 28 of the body 24 is also the central axis of the fuel injector 26, and the front end 34 of the body 24 also forms the front end of the fuel injector 26. The front end 34 may form a single flat radial surface substantially normal to the central axis 28 or may define a radial surface having axial steps as shown in FIG. 2.

It should be noted that the terms "axial", "radial", "circumferential" and "tangential" are used with respect to the central axis 28. It should also be noted that the terms "downstream" and "upstream" are defined with respect to the direction of the air and fuel flow passing through the fuel injector 26.

The fuel injector 26 according to one embodiment may include an axially-extending first annular passage 38 defined in the body 24, surrounding the central axis 28 and radially outwardly spaced apart from the central cylindrical cavity 30. The first annular passage 38 may define an open downstream end 40 on the front end 34 of the body 24 and may include an annular lip 42 disposed in a closed upstream section of the first annular passage 38 and projecting axially thereinto, to radially divide the closed upstream section into an outer-diameter upstream subsection 42a and an inner-diameter upstream subsection 42b. The axially-extending first annular passage 38 may be defined radially between a radially-outer passage wall 44 and a radially-inner passage wall 46. The outer-diameter upstream subsection 42a is therefore defined radially between the radially-outer passage wall 44 and the annular lip 42, and the inner-diameter upstream subsection 42b is therefore defined radially between the annular lip 42 and the radially-inner passage wall 46. The axial dimension of the annular lip 42 is limited with respect to the axial length of the axially-extending first annular passage 38 such that the axial length of the radially divided upstream section (terminating at the tip of the annular lip 42) of the first annular passage 38 is shorter than the axial length of a radially un-divided downstream section (starting from the tip of the annular lip 42) of the first annular passage 38.

The fuel injector 26 according to one embodiment may include a plurality of circumferentially spaced spiral or tangentially-oriented fuel inlet passages 48 defined in the body 24. The circumferentially spaced spiral or tangentially-oriented fuel inlet passages 48 at the downstream end thereof may be in fluid communication with the outer-diameter upstream subsection 42a of the first annular passage 38, and at the upstream end thereof may be in fluid communication with an annular fuel distribution passage 50. The annular fuel distribution passage 50 may be defined within the body 24 and in turn may be in fluid communication with a fuel supply passage 52 which extends through the body 24 and is in fluid communication with the fuel supply system 20 of the engine (see FIG. 1).

The fuel injector 26 according to one embodiment may include a plurality of circumferentially spaced spiral or tangentially-oriented first air inlet passages 54 defined in the body 24 and in fluid communication with the inner-diameter upstream subsection 42b of the first annular passage 38. The first air inlet passages 54 are also in fluid communication with pressurized air, for example P3 air surrounding the fuel injector 26, or otherwise via pipes, which are known and will not be further described.

The circumferentially spaced spiral or tangentially-oriented fuel inlet passages 48 and circumferentially spaced spiral or tangentially-oriented first air inlet passages 54 may be configured to both extend downstream in a same rotational direction such that the fuel and air introduced by the respective fuel inlet passages 48 and the first air inlet passages 54, rotate within the first annular passage 38 in the same rotational direction.

In this embodiment, the circumferentially spaced spiral or tangentially-oriented first air inlet passages 54 may determine a first cross-section of the fuel injector 26 as shown in FIG. 4, in which respective centerlines 54a of the first air inlet passages 54 are defined. The circumferentially spaced spiral or tangentially-oriented fuel inlet passages 48 may define a second cross section of the fuel injector 26 as shown in FIG. 5, in which respective centerlines 48a of the fuel inlet passages 48 are defined. The second cross-section may be axially located downstream of the first cross-section with respect to the first annular passage 38. The respective first air inlet passages 54 and the fuel inlet passages 48 extend radially inwardly toward the first annular passage 38, and therefore such an axial location arrangement provides convenience for connecting the fuel inlet passages 48 and first air inlet passages 54 to the radially outer-diameter upstream subsection 42a and radially inner-diameter upstream subsection 42b, respectively, without interference therebetween.

In this embodiment the respective circumferentially spaced spiral or tangentially-oriented first air inlet passages 54 may incline axially in a downstream direction of the first annular passage 38 while extending radially inwardly toward the first annular passage 38, defining a small angle A1 of, for example 3-5 degrees between the respective centerlines 54a and a radial plane B1 normal to the central axis 28 of the fuel injector 26. Similarly, the respective circumferentially spaced spiral or tangentially-oriented fuel inlet passages 48 may incline axially in the downstream direction of the first annular passage 38 while extending radially inwardly toward the first annular passage 38, to define a small angle A2 of, for example 3-5 degrees between the respective centerlines 48a and a radial plane B2 normal to the central axis 28 of the fuel injector 26. Therefore, the cross-sections determined by the respective first air inlet passages 54 and fuel inlet passages 48 may present a conical profile around the central axis 28 of the fuel injector 26. The small angles A1 and A2 of the respective first air inlet passages 54 and fuel inlet passages 48 will provide axial components of velocity to respective air and fuel flows which form a respective fuel layer vortex 62b and an air layer vortex 64b moving axially through the first annular passage 38.

The fuel injector 26 according to one embodiment may further include an axially-extending second annular passage 56 defined in the body 24, having a closed upstream end thereof and an annular exit 58 at a downstream end thereof. The second annular passage 56 may be disposed to surround the central axis 28 and may be radially outwardly spaced apart from the first annular passage 38. A plurality of circumferentially spaced spiral or tangentially-oriented second air inlet passages 60 may be defined in the body 24, and may be in fluid communication at downstream ends thereof with the second annular air passage 56. The respective second air inlet passages 60 may also be in fluid communication with pressurized air such as P3 air surrounding the fuel injector 26, or via pipes. The respective second air inlet passages 60 according to one embodiment as shown in FIG. 6, may be configured to extend radially inwardly towards the second annular passage 56, in a rotational direction opposite to the rotational direction of the first air inlet passages 54 and the fuel inlet passage 48 as shown in FIGS. 4 and 5.

The second air inlet passages 60 may also determine a cross-section of the fuel injector 26 (see FIGS. 2 and 6) in which the respective centerlines 60a of the second air inlet passages 60 are defined. The second air inlet passages 60 may also incline axially in the downstream direction of the second annular passage 56 while extending radially inwardly toward the second annular passage 56 to define a small angle A3 of, for example 3-5 degrees between the respective centerlines 60a of the second air inlet passages 60 and a radial plane B3 normal to the central axis 28 of the fuel injector 26. Therefore, similar to the cross-sections determined by the respective first air inlet passages 54 and fuel inlet passages 48, the cross-section determined by the second air inlet passages 60 presents a conical profile around the central axis 28 of the fuel injector 26. The small angle A3 will also provide an axial component to a velocity of the air introduced into the second annular passage 56 to facilitate the axial movement of a swirling airflow passing through the second annular passage 56.

The second annular passage 56 may also incline radially inwardly while axially extending towards the annular exit 58 thereof, providing an inclination angle with respect to the central axis 28.

A fuel flow 62 may be pumped under a high fuel pressure from the fuel supply system 20 of the engine into the fuel supply passage 52 and then enters the annular fuel distribution passage 50. The fuel flow 62 may be distributed from the annular fuel distribution passage 50 into the plurality of circumferentially spaced spiral or tangentially-oriented fuel inlet passages 48, to form a plurality of fuel flows 62a resulting in swirling fuel which enters the outer-diameter upstream subsection 42a of the first annular passage 38 wherein the swirling fuel rotates for example in a counter-clockwise direction at a high velocity to form the fuel layer vortex 62b rotating within the first annular passage 38 and axially moving toward the open downstream end 40 of the first annular passage 38. The fuel layer vortex 62b may rotate at a sufficiently high velocity, for example 100 feet per second or higher, such as 200 feet per second or even higher, to create a strong centrifugal force which forces the fuel layer vortex 62b to rotate in a counter-clockwise direction against and along the radially-outer passage wall 44 and to flow axially through the first annular passage 38, without being in contact with the radially-inner passage wall 46 of the first annular passage 38. The fuel layer vortex 62b may be discharged radially outwardly from the open downstream end 40 of the first annular passage 38, immediately adjacent the radially-outer passage wall 44, as a thin sheet 62c of swirling fuel (or the swirling fuel film sheet 62c). Under the centrifugal force thereof, the thin sheet 62c of swirling fuel may also have a tendency to flow radially-outwardly such that the thin sheet 62c of swirling fuel may present in a "skirt" profile.

Under an air pressure such as P3 air, a plurality of airflows 64a may be introduced into the inner-diameter sub-upsection 42b of the first annular passage 38 via the respective first air inlet passages 54, to form the air layer vortex 64b which may rotate in a counter-clockwise direction to fill into and pass through an annular space defined by and radially between the fuel layer vortex 62b and the radially-inner passage wall 46. Due to the velocity of the air layer vortex 64b which is lower than the velocity of the fuel layer vortex 62b, and due to the inherent density of air which is lower than the inherent density of fuel, the centrifugal force created by the air layer vortex 64b may not be strong enough to cause the air layer vortex 64b to penetrate into the fuel layer vortex 62b such that the air layer vortex 64b may be in contact with but free of mixing with the fuel layer vortex 62b within the first annular passage 38. Instead of being in contact with the radially-inner passage wall 46 of the first annular passage 38, an inner side of the fuel layer vortex 62b may be in contact with an outer side of the air layer vortex 64b which has a lower velocity in the same counter-clockwise direction such that the friction between the fuel layer vortex 62b and the first annular passage 38 is considerably reduced when the fuel layer vortex 62b passes through the first annular passage 38.

Under an air pressure such as P3 air, a plurality of air flows 66a may be introduced into the second annular passage 56 via the respective second air inlet passages 60, to form an swirling air 66b which rotates within the second annular passage 56 and is discharged from the annular exit 58 of the second annular passage 56. Due to the small radially inward inclination angle of the second annular passage 56 and the thin sheet 62c of swirling fuel discharged radially outwardly from the open downstream end 40 of the first annular passage 38 in a "skirt" profile, the swirling air 66b discharged from the annular exit 58 of the second annular passage 56 may impinge on the thin sheet 62c of swirling fuel which has a very high velocity, resulting in effective atomization of the fuel which is sprayed into the combustion chamber of the engine.

The swirling air 66b may swirl in a rotational direction the same as the rotational direction of the fuel layer vortex 62b and may thus rotate the same as the thin sheet 62c of swirling fuel discharged from the open downstream end 40 of the first annular passage 38, or may swirl in a direction different from the rotational direction of the fuel layer vortex 62b, such as in a clockwise direction and may thus counter-rotate with respect to the thin sheet 62c of swirling fuel, as illustrated in FIGS. 4-7.

When an atomized fuel flow sprayed mostly in an axial direction and in a substantially non-rotating pattern is desired, the swirling air 66b may be generated to have a rotational velocity in a rotational direction opposite to the rotational direction of the thin sheet 62c of swirling fuel in order to atomize the thin sheet 62c of swirling fuel through a type of shearing action, which counters the rotational component of the velocity of the thin sheet of swirling fuel and may also benefit countering the radial component of the velocity of the thin sheet 62c of swirling fuel.

The second annular passages 56 may be configured to have a selected radially inward inclination angle to determine a direction of impingement on the thin sheet 62c of swirling fuel discharged from the open downstream end 40 of the first annular passage 38. A selected velocity of the fuel layer vortex 62b rotating and flowing in the first annular passage 38, determines the centrifugal force thereof and thus the radially-outward "skirt" profile of the thin sheet 62c of swirling fuel discharged from the open downstream end 40 of the first annular passage 38. The combination of the selected inclination angle of the second annular passage 56 and the velocity of the fuel layer vortex 62b rotating and flowing in the first annular passage 38 can be set to control the fuel spray characteristics of the atomized fuel.

Optionally, the radially outer passage wall 44 and/or radially-inner passage wall 46 of the first annular passage 38 may also have a small radially-outward inclination angle while extending toward the open downstream end 40, which may affect the formation of the "skirt" profile of the thin sheet 62c of swirling fuel discharged from the open downstream end 40 of the first annular passage 38.

The air layer vortex 64b rotating and flowing within the first annular passage 38 is also discharged from the open downstream end 40, adjacent the radially-inner wall 46 of the first annular passage 38 and is then mixed with fuel during the atomization of the fuel.

Comparing to conventional air blast nozzles which control the spray mainly by air hole size and arrangement thereof, the described embodiments provide an additional means for controlling the spray. The length and geometry of the annular lip 42 will affect fuel spinning in the annular passage 38 and, as a result, fuel film exit characteristics, which can be optimized for a particular application. Therefore, the described embodiments advantageously improve fuel atomization and reduce orifice erosion of fuel spray nozzles.

The above description is meant to be exemplary only, and one skilled in the art will recognize that changes may be made to the embodiments described without departing from the scope of the described subject matter. For example, the schematically illustrated turbofan gas turbine engine is an exemplary application of the described subject matter, however the described subject matter may be applicable to gas turbine engines of other types. The various fluid passages of the fuel injector described in the embodiments may be defined in an injector body which can be configured differently from the illustration of the drawings. Modifications which fall within the scope of the described subject matter will be apparent to those skilled in the art, in light of a review of this disclosure, and such modifications are intended to fall within the appended claims.

The invention claimed is:

1. A fuel injector for a fuel spray nozzle of a gas turbine engine combustor, the fuel injector defining an axial central axis thereof and comprising:
   an axially-extending first annular passage surrounding the central axis and located between radially outer and inner passage walls, the first annular passage having an open downstream end and including an annular lip projecting axially into and radially dividing an upstream section of the first annular passage into an outer-diameter upstream subsection and an inner-diameter upstream subsection, the outer-diameter upstream subsection configured for guiding a fuel layer vortex formed in the outer-diameter upstream subsection to flow along the annular outer passage wall toward the open downstream end, and the inner-diameter upstream subsection configured for guiding an air layer vortex formed in the inner-diameter upstream subsection to fill into and pass through an annular space defined by and radially between the fuel layer vortex and the annular inner passage wall;
   a plurality of circumferentially spaced spiral or tangentially-oriented fuel inlet passages in fluid communication with the outer-diameter upstream subsection of the first annular passage to deliver respective fuel flows into the first annular passage to form the fuel layer vortex; and
   a plurality of circumferentially spaced spiral or tangentially-oriented first air inlet passages in fluid communication with the inner-diameter upstream subsection of the first annular passage to deliver respective first air flows into the first annular passage to form the air layer vortex.

2. The fuel injector as defined in claim 1 further comprising:
   an axially-extending second annular passage having an annular exit, the second annular passage surrounding the axial central axis and being radially outwardly spaced apart from the first annular passage, the second annular passage being configured for conveying a swirling air flow to the annular exit and discharging the swirling air flow from the exit; and
   a plurality of circumferentially spaced spiral or tangentially-oriented second air inlet passages in fluid communication with the second annular passage to deliver respective second air flows into the second annular passage to form the swirling air flow.

3. The fuel injector as defined in claim 2 wherein the respective second air inlet passages extend radially inwardly toward the second annular passage, inclining in a downstream direction of the second annular passage.

4. The fuel injector as defined in claim 2 wherein the second air inlet passages are configured to deliver fluid in a second rotational direction about the axial central axis, opposite to a first rotational direction in which the fuel inlet passages are configured to deliver fluid.

5. The fuel injector as defined in claim 2 wherein the second annular passage extends downstream with a radially-inward inclination.

6. A fuel spay nozzle having the fuel injector as defined in claim 2.

7. The fuel spray nozzle as defined in claim 6 further comprising a radially inward pilot fuel injector surrounded by the first and second annular passages.

8. The fuel injector as defined in claim 1 wherein the fuel inlet passages and the first air inlet passages are configured to deliver fluid in a same rotational direction about the central axis.

9. The fuel injector as defined in claim 1 further comprising an annular fuel distribution passage in fluid communication with the respective fuel inlet passages for distributing fuel to the fuel inlet passages.

10. The fuel injector as defined in claim 9 further comprising a fuel supply passage in fluid communication with the annular fuel distribution passage.

11. The fuel injector as defined in claim 1 wherein the respective first air inlet passages extend radially inwardly toward the first annular passage, inclining axially in a downstream direction of the first annular passage.

12. The fuel injector in claim 1 wherein the respective fuel inlet passages extend radially inwardly toward the first annular passage, inclining axially in a downstream direction of the first annular passage.

13. The fuel injector as defined in claim 1 wherein a centerline axis of the respective first air inlet passages determines a first cross-section of the fuel injector and a centerline of the respective fuel inlet passages determines a second cross-section of the fuel injector, the second cross section being axially located downstream of the first cross section with respect to the first annular passage.

14. The fuel injector as defined in claim 1 wherein an axial length of the radially divided upstream section of the first annular passage is shorter than an axial length of a radially un-divided downstream section of the first annular passage.

\* \* \* \* \*